United States Patent
Szermutzky et al.

(10) Patent No.: US 9,022,354 B2
(45) Date of Patent: May 5, 2015

(54) SWITCHING VALVE HAVING A VALVE ELEMENT MOVABLE IN A HOUSING

(75) Inventors: Valentin Szermutzky, Bruchkoebel (DE); Heiko Roth, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 60 days.

(21) Appl. No.: 13/510,686

(22) PCT Filed: Sep. 28, 2010

(86) PCT No.: PCT/EP2010/064331
§ 371 (c)(1),
(2), (4) Date: May 18, 2012

(87) PCT Pub. No.: WO2011/060989
PCT Pub. Date: May 26, 2011

(65) Prior Publication Data
US 2012/0223261 A1    Sep. 6, 2012

(30) Foreign Application Priority Data
Nov. 18, 2009  (DE) .......................... 10 2009 046 822

(51) Int. Cl.
*F01L 3/10* (2006.01)
*F16K 31/06* (2006.01)

(52) U.S. Cl.
CPC ......... *F16K 31/0689* (2013.01); *F16K 31/0696* (2013.01)

(58) Field of Classification Search
USPC ...................... 251/64, 129.15, 337; 303/119.2
See application file for complete search history.

(56) References Cited

U.S. PATENT DOCUMENTS

| | | | |
|---|---|---|---|
| 3,633,053 A * | 1/1972 | Peters | 310/15 |
| 4,690,374 A | 9/1987 | Polach et al. | |
| 4,878,650 A * | 11/1989 | Daly et al. | 251/129.15 |
| 5,533,873 A | 7/1996 | Kindl | |
| 6,019,344 A | 2/2000 | Engel et al. | |
| 6,737,766 B1 * | 5/2004 | Burrola et al. | 310/23 |
| 6,783,086 B1 | 8/2004 | Boecking | |
| 2001/0023931 A1 * | 9/2001 | Fukano | 251/129.15 |
| 2003/0213928 A1 * | 11/2003 | Masuda et al. | 251/129.15 |
| 2004/0155212 A1 | 8/2004 | Hess et al. | |
| 2005/0173979 A1 * | 8/2005 | Voss | 303/119.2 |
| 2007/0069166 A1 * | 3/2007 | Sisk et al. | 251/64 |
| 2008/0308760 A1 * | 12/2008 | Matsumoto et al. | 251/129.15 |
| 2010/0084590 A1 * | 4/2010 | Dayton et al. | 251/129.15 |
| 2013/0126768 A1 * | 5/2013 | Waterstredt | 251/129.15 |

FOREIGN PATENT DOCUMENTS

| | | |
|---|---|---|
| CN | 101080584 A | 11/2007 |
| CN | 200998989 Y | 1/2008 |
| DE | 197 54 525 C1 | 4/1999 |
| DE | 199 35 098 A1 | 2/2000 |
| DE | 10160970 A1 | 6/2003 |
| DE | 10254246 A1 | 2/2004 |

(Continued)

*Primary Examiner* — Matthew W Jellett
(74) *Attorney, Agent, or Firm* — Maginot, Moore & Beck LLP

(57) ABSTRACT

The invention provides a switching valve having a valve element which is movable in a housing, an actuating apparatus acting on the valve element in a first direction and a spring apparatus charging the valve element in a second direction. According to the invention, the first and second directions are in opposition and the spring apparatus has a progressive spring characteristic.

5 Claims, 2 Drawing Sheets

(56) References Cited

FOREIGN PATENT DOCUMENTS

| | | |
|---|---|---|
| EP | 0 698 738 A2 | 2/1996 |
| GB | 2 340 208 A | 2/2000 |
| JP | 4-63880 U | 5/1992 |
| JP | 9-144918 A | 6/1997 |
| WO | 2009/022606 A1 | 2/2009 |

* cited by examiner

SWITCHING VALVE HAVING A VALVE ELEMENT MOVABLE IN A HOUSING

CROSS-REFERENCE TO RELATED APPLICATION

This application is a 35 USC 371 application of PCT/EP 2010/064331 filed on Sep. 28, 2010.

BACKGROUND OF THE INVENTION

1. Field of the Invention

The invention relates to a switching valve.

2. Description of the Prior Art

Switching valves, especially fast-switching solenoids, are known on the market. They are used in the automotive field, for instance, in injection systems, automatic transmissions, or anti-lock brake systems. Often, they have short ON and OFF times and hence are switched on and off especially frequently. Such switching valves are often actuated by an electromagnet, and a magnet armature executes an axial motion that is limited by a seat of repose and a stroke stop. Often, upon actuation the armature is supplied with current, and after the current is switched off, the armature is moved back to its original position by a spring. It is also known for to damp such a switching valve by means of a device that is adapted to the structural type of the switching valve.

The following published references are also mentioned: German patent disclosures DE 10 2007 034 038 A1, DE 10 2007 028 960 A1, DE 10 2005 022 661 A1, DE 10 2004 061 798 A1, DE 2004 016 554 A1, DE 103 27 411 A1, and DE 198 34 121 A1, and European patent disclosures EP 1 701 031 A1, EP 1 471 248 A1, and EP 1 296 061 A2.

Advantages and Summary of the Invention

The switching valve of the invention has the advantage that the impact speed of a valve element, or of an armature coupled to it, against a stop is reduced without substantially lengthening the switching times of the switching valve. Because of the lesser impact speed, there is less wear on the switching valve. Pressure pulsations in the medium to be delivered are likewise lessened. In addition, the excitation of mechanical vibration and the attendant noise emission are reduced.

The invention is based on the concept of designing the spring device such that for an increasing spring travel, it requires not a linear but a progressive spring constant. By means of this kind of progressive spring characteristic (characteristic spring curve), the valve element can be effectively braked in its motion, in particular before reaching a terminal position. The spring action ensues comparatively early, but softly, and it becomes markedly stronger only toward the end of the motion of the valve element. This means that over a wide range of motion, the valve element is acted upon only weakly by the spring device, so that initially, a fast acceleration of the valve element is made possible. For example, beyond half of a stroke of the valve element, as a consequence of the progressively increasing spring force, there is no further acceleration of the valve element. Temporarily—depending on the properties of the actuating device and of the spring—an approximately uniform motion may result. Comparatively shortly before the terminal position is reached, the valve element is braked markedly more strongly, and by no later than the terminal position it will have been braked to a standstill. Compared with a spring force that increases only linearly, the impact speed is reduced more sharply. In the process, the switching times of the switching valve are not lengthened substantially. A further advantage of the invention is that—in contrast to an arrangement having only one spring portion with a high spring constant—the spring prestressing force is less vulnerable to tolerances, and thus the spring prestressing is easier to adjust.

The switching valve functions better if the spring device includes a series circuit of at least two spring portions, and the maximum spring travel of a spring portion is less than the maximum stroke of the valve element. By means of such an arrangement of at least two spring portions, the prerequisite of dimensioning the spring device in manifold ways is met. As a function of the series circuit of the spring portions and their optionally different stiffness, the stroke of the valve element is distributed among the individual spring portions; that is, the maximum spring travel of each spring portion is less than the total spring travel.

To that end it is provided that at least two spring portions are coupled via an adapter piece, and the adapter piece strikes a portion of the housing before the maximum stroke of the valve element is reached, so that the softer spring portion is subsequently bridged. The result is an action of the spring device as follows: In a first phase of the motion of the valve element, the adapter piece has not yet struck the portion of the housing, and thus the force acts on all the spring portions that are connected in series. All the spring portions are upset with the same force. Accordingly, the resultant total spring constant is relatively low, so that the spring device initially acts with only a comparatively slight force on the valve element that is to be moved. In the further course of the motion of the valve element, the adapter piece strikes the portion of the housing. As a result, at least one spring portion is bridged, since after that it cannot be upset any more strongly. In the further course of the motion of the valve element, accordingly only the remaining spring portion or spring portions are upset further. On account of the series circuit of the spring portions, the resultant spring constant becomes greater; that is, upon each identical change of travel, the associated change of force is greater. In this way, the motion of the valve element is now braked with comparatively great force and thus more strongly.

With this basic arrangement of the spring device, many embodiments are possible. For instance, a plurality of spring portions can be connected in series, with one adapter piece disposed between each two spring portions. Preferably—if there is a plurality of adapter pieces—the adapter pieces strike the respective portions of the housing successively in the course of the motion of the valve element. Hence the resultant characteristic spring curve can be dimensioned in manifold ways. For example, it can be favorable for a first phase of the armature motion, in which no adapter piece has yet struck its stop, to be designed as comparatively long within the maximum armature stroke available, so that the braking action ensues comparatively late, but in turn strongly. A characteristic spring curve that is progressive overall is even achieved if the individual spring portions have the same spring constant. The spring portions can for instance be implemented in the form of separate springs, which at their end portions are each firmly coupled via a respective adapter piece. Alternatively, they form one cohesive spring, onto which one or more adapter pieces are placed at specified intervals. As a result, only one spring in all is needed, which reduces production costs and enhances the reliability of the spring device.

A switching valve is also proposed whose spring portions have different spring constants. Regardless of their number, embodiment and disposition, the individual spring portions can have a characteristic spring curve that is intrinsically constant, or progressive. The latter option is structurally possible with helical springs, for example. Overall, the switching valve of the invention further increases the progression of the characteristic spring curve. Accordingly, the effect when the valve element is braked before reaching the terminal position is even greater.

The spring device of the switching valve of the invention can be used more flexibly if at least one spring portion includes a helical spring, plate spring, annular washer, and/or wave washer. As a result, the spring device can be embodied in numerous further variants, so that it can be adapted even better to the demands that arise in terms of force, characteristic curve, spring stroke, space required, durability, or production costs.

A further embodiment of the invention provides that the at least two spring portions include helical springs with different diameters, and that the adapter piece has a cup-shaped structural form, such that two spring portions each are connected functionally in series, but in spatial terms are disposed coaxially one inside the other. In this way, an especially compact structural form of the spring device can be produced, so that the switching valve as a whole can be small.

One embodiment of the invention provides that the switching valve is an electromagnetic switching valve. The invention can thus advantageously be employed for an especially frequently occurring structural type of switching valves.

A further embodiment of the switching valve provides that it is a switching valve in an injection system, an automatic transmission, or an anti-lock brake system of a motor vehicle. Such applications demand especially precise operation of the switching valve. This is reinforced by the spring device of the invention, which comprises mechanical components that can be manufactured with precision. The overall result is correspondingly precise operation of the switching valve. The invention is especially well suited to use in a quantity control valve of a high-pressure fuel pump in a common-rail system.

BRIEF DESCRIPTION OF THE DRAWINGS

Below, exemplary embodiments of the invention are described in conjunction with the drawings. In the drawings.

DESCRIPTION OF THE PREFERRED EMBODIMENTS

Figure 1:
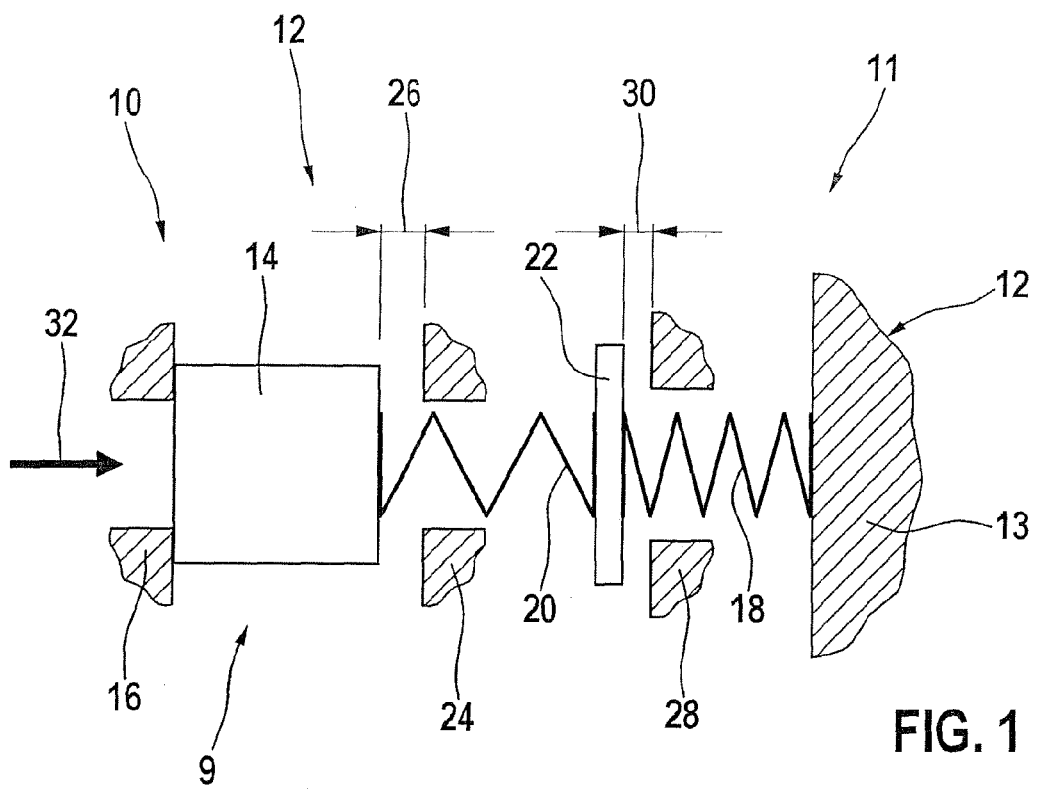
FIG. 1 is a functional block circuit diagram of a spring device of a switching valve.

In all the drawing figures, the same reference numerals are used for elements and sizes that are functionally equivalent, even in different embodiments.

FIG. 1, in a simplified schematic diagram, shows a region of a switching valve 10 having an electromagnetic actuating device 9 and a spring device 11. The switching valve 10 may for instance be an electromagnetic quantity control valve, with which a fuel quantity that is delivered to a high-pressure pump in a common-rail fuel system is controlled.

Various portions are shown of a housing 12 that is not shown in further detail. In the left-hand part of FIG. 1, an armature 14 is shown, which is coupled with a valve element not shown in FIG. 1 and which in the outset position shown rests on a seat of repose 16. Further elements of the aforementioned actuating device, such as a coil or a pole core, are not shown in FIG. 1. The seat of repose 16 either is an element of the housing 12 or is connected to it. On the right in the drawing, a portion 13 of the housing 12 is shown on which a first spring portion 18 of the spring device 11 is supported. The first spring portion 18 is adjoined toward the left in the drawing by a second spring portion 20, which on its left end portion rests on the armature 14. The two spring portions 18 and 20 are accordingly braced between the armature 14 and the housing portion 13. An adapter piece 22 is disposed between the first spring portion 18 and the second spring portion 20. A stroke stop 24 that is part of the housing 12 limits the motion of the armature 14 to the right in the drawing. The attainable stroke stop is marked 26. A stop 28, also part of the housing, limits the motion of the adapter piece 22, and the attainable stroke distance of the adapter piece 22 is marked 30. In the region shown, the switching valve 10 is constructed essentially rotationally symmetrically.

In FIG. 1, an outset position of the switching valve 10 when current is not being supplied is shown. The armature 14 rests on its seat of repose 16, while the adapter piece 22 is not resting on its stop 28. The motion of the armature 14, of the two spring portions 18 and 20, and of the adapter piece 22 is effected in the axial direction, or in other words in the drawing in FIG. 1 in the horizontal direction. An arrow 32 illustrates this.

When current is supplied to the switching valve or an exciter coil, the armature 14 is moved as indicated by the arrow 32. In the process, the spring portions 18 and 20 are subjected to pressure, or in other words are upset. In the present instance, the second spring portion 20 has a higher spring constant than the first spring portion 18. Accordingly, upon the motion of the armature 14, the first spring portion 18 is compressed more than the second spring portion 20. That is, the second spring portion 20 is comparatively stiff. In the course of the motion of the armature 14, the adapter piece 22 strikes the stop 28. As a result, the first spring portion 18 is bridged; it cannot be compressed further and to this extent is without any effect. It follows that after this, the spring action of the spring device is determined only by the second, stiffer spring portion 20. Because of the higher spring constant of the second spring portion 20, the behavior of the spring device is "abruptly" progressive. The effect of the second, stiffer spring portion 20 extends predominately to a range of motion of the armature 14 near the stroke stop 24. In this final phase of the armature motion, the armature 14 is therefore braked especially strongly. The motion of the armature 14 ends at the stroke stop 24, at which any residual kinetic energy is reduced to nothing.

It can be seen that the maximum stroke distance 30 of the adapter piece 22 must be selected such that the adapter piece rests on the stop 28 before the armature 14 comes into contact with the stroke stop 24. Overall, the effect of the spring device is such that the armature, in its first phase of motion, beginning at the seat of repose 16, is initially braked only little. This means that the armature motion can happen comparatively fast, and the switching valve 10 also switches at high speed. Only shortly before the stroke stop 24 is reached does a comparatively strong braking action by the spring device ensue. This greatly reduces the impact speed of the armature on the stroke stop 24.

If the current supply is interrupted, then the magnetic force acting in the direction of the arrow 32 disappears. As a consequence, the armature 14 is moved back onto the seat of repose 16 by the spring device 11, counter to the direction of the arrow 32. No additional devices for moving the armature 14 back onto the seat of repose 16—such as a second exciter coil—are shown in FIG. 1.

A further embodiment, not shown, of the switching valve is constructed as in FIG. 1, but instead of two spring portions, it has three, and instead of only one adapter piece, it has two. The spring portion located close to the housing portion has a low spring constant; the spring portion located close to the armature has a high spring constant; and a middle spring portion, located between the other two spring portions, has a medium spring constant. Fitting this situation, a distance that defines the stroke of the second adapter piece is, in terms of its size, between the distance that determines the armature stroke and the distance that determines the stroke of the first adapter piece.

Another embodiment of the switching valve, which is not shown, has one spring portion with a plate spring and one spring portion with an annular washer. Still another embodiment of the switching valve, also not shown, has one spring portion with a dc and one spring portion with a wave washer.

Figure 2:
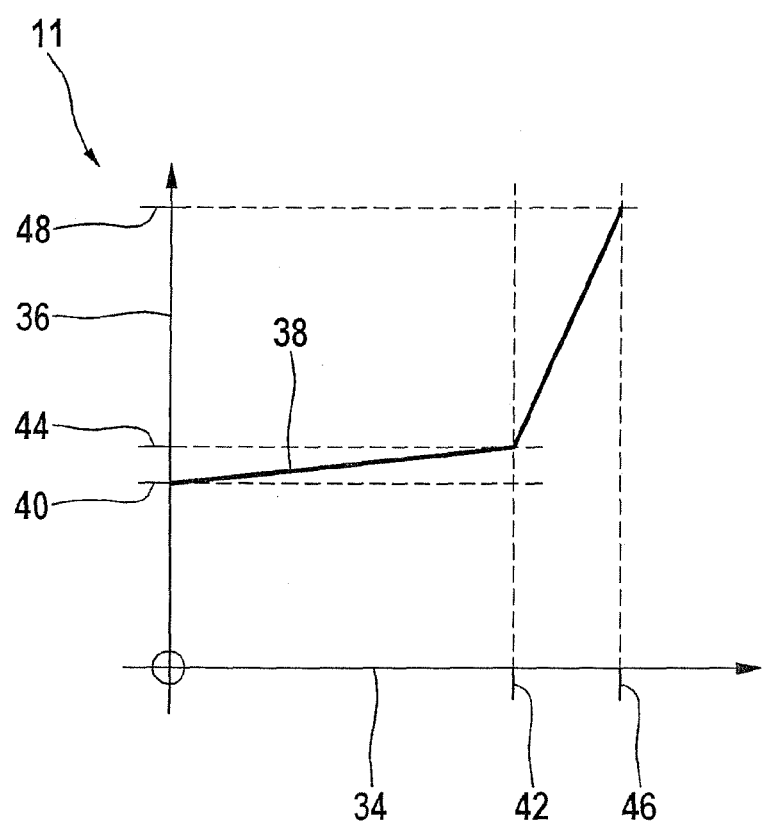
FIG. 2 shows a characteristic spring curve that fits FIG. 1.

FIG. 2 shows a resultant characteristic spring curve for an arrangement that is similar to FIG. 1 and comprises two spring portions. A coordinate system is shown, on the abscissa of which a spring travel 34 is plotted that determines the motion of the armature 14 and on the ordinate of which a spring force 36 is plotted. A characteristic spring curve 38 illustrates the relationship. A spring travel 34 of zero is equivalent to an outset state, when current is not being supplied, as in FIG. 1.

Beginning at a spring travel of zero in the left-hand region of FIG. 2 and with a spring force 40, the spring force increases as the spring travel increases. At a spring travel 42, a spring force 44 is attained. This is precisely the spring travel at which the adapter piece 22 comes into contact with the stop 28. Beyond that stroke, the first spring portion 18 is bridged; that is, it is not compressed further. In the further course of the motion of the armature 14 in the direction of the stroke stop 24, only the second spring portion 20 is now acted upon. In accordance with a higher spring constant of the second spring portion 20, the characteristic spring curve 38 rises more steeply beyond the spring travel 42; that is, the overall characteristic curve is progressive. Finally, at a spring travel 46, the armature 14 strikes its stroke stop 24, whereupon a maximum spring force 48 is reached. The spring travel 46 corresponds to the distance 26 in FIG. 1.

It can be seen how, by means of a series circuit of two spring portions 18 and 20, the resultant characteristic spring curve 38 becomes highly progressive, with an abrupt change in the steepness of the characteristic spring curve 38. A progression in the characteristic spring curve 38 automatically ensues whenever the spring constants of the first spring portion 18 and of the second spring portion 20 are equal. This also happens if—unlike what is shown in FIG. 1—the two spring portions 18 and 20 form a single spring, and the adapter piece 22 is permanently inserted only into the helical part of the spring.

If the spring constant for the first spring portion is R1 and the spring constant for the second spring portion is R2, the result is the relationship expressed by the following equation:

$$R_{total}=1/(1/R1+1/R2)$$

The resultant total spring constant $R_{total}$ is accordingly less than R1 and less than R2 and thus is comparatively soft, as long as both spring portions are functioning.

In FIG. 2, this equation applies to a spring travel 34 between zero and the spring travel 42. Between the spring travel 42 and the spring travel 46, conversely, the spring constant R1 of the first spring portion 18 is no longer operative; only the spring constant R2 applies. In general, in the series circuit of a plurality of spring portions according to the invention, it is true that in the course of the spring travel, the stiffness of the resultant spring can only increase, but not decrease.

Figure 3:
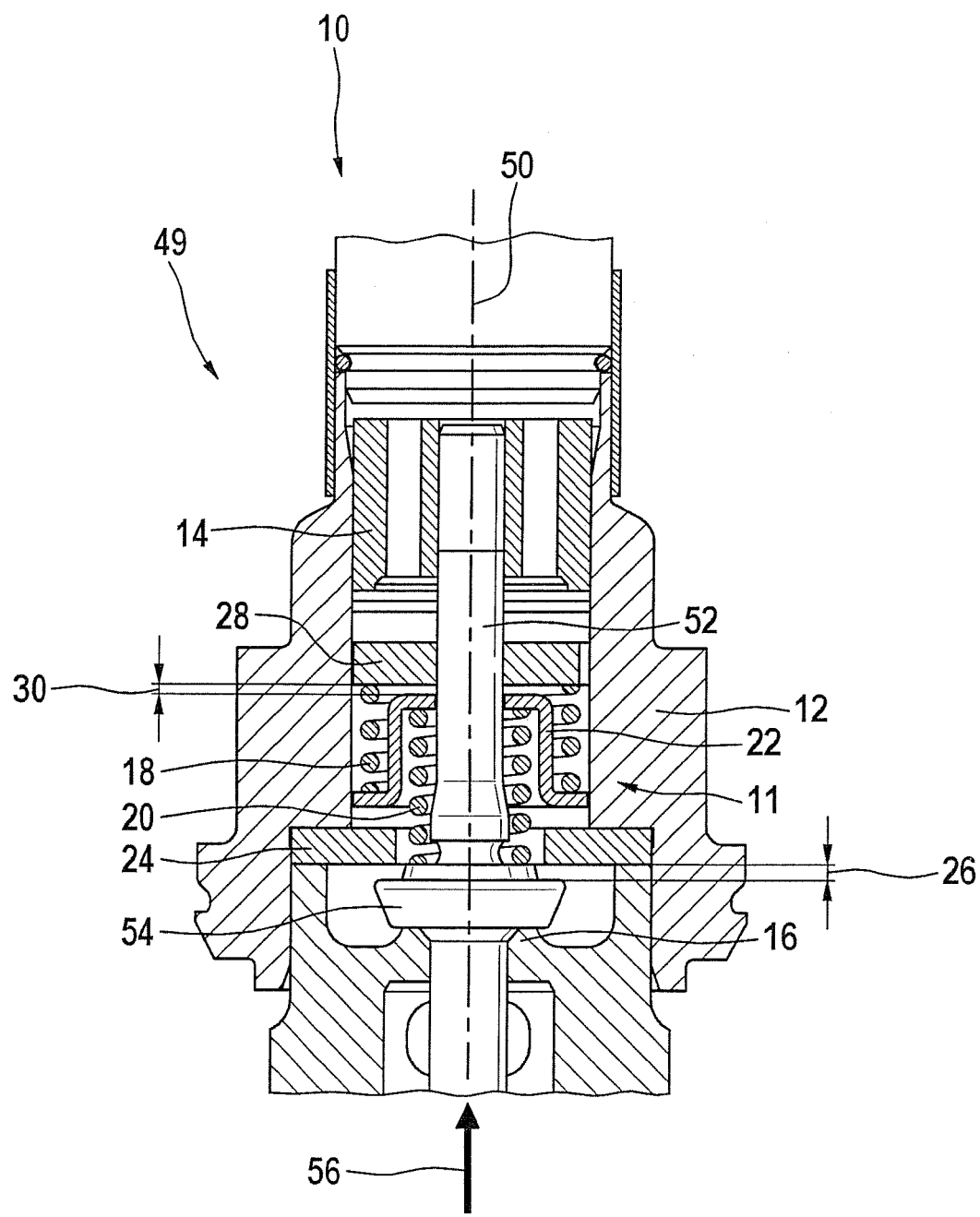
FIG. 3 shows an embodiment of a switching valve in a sectional view.

FIG. 3 shows an embodiment of a switching valve 10 as an electromagnetic switching valve 49 for switching a fluid. The fluid-carrying regions are not shown in the view shown in FIG. 3. The elements shown in FIG. 3 are essentially embodied rotationally symmetrically about an axis 50. The axis 50 extends vertically in terms of the drawing in FIG. 3.

In the housing 12, there is an axially displaceable valve element 52, with a valve plate 54 disposed fixedly on it. Here, the armature 14 is also coupled fixedly to the valve element 52. The first spring portion 18 is disposed between the cup-shaped adapter piece 22 and the stop 28. The second spring portion 20 is disposed between the cup-shaped adapter piece 22 and the plate 54. Thus the two spring portions 18 and 20 are coupled and connected functionally in series via the adapter piece 22. In this instance, the two spring portions 18 and 20 are embodied as helical springs with different diameters.

The status of the switching valve 10 of FIG. 3 is equivalent to the outset state, when current is not being supplied, of FIG. 1, and the valve plate 54 rests on the seat of repose 16.

When current is supplied to the switching valve 10, the armature 14 and the valve element 52 connected fixedly to the armature 14 move upward in terms of the drawing, in the direction of an arrow 56. In the process, the cup-shaped adapter piece 22 fastened between the spring portions 18 and 20 is moved as well, and after traversing the distance 30 it strikes the stop 28. For the remainder of the stroke of the armature 14, therefore only the spring portion 20 is acted upon and, with its high spring constant, brakes the valve element 52 especially strongly in the final phase of the motion. The motion ends with the impact of the valve plate 54 against the stroke stop 24.

It can be seen that the distance 30 that predetermines the maximum stroke of the adapter piece 22 is shorter than the distance 26 that determines stroke of the valve plate 54 or of the armature 14. Compared to the dimensions of the switching valve 10, both distances 26 and 30 are short. The two spring portions 18 and 20 are disposed coaxially on the inside and outside of the adapter piece 22, respectively. The cup shape that defines the adapter piece 22 makes a particular contribution to the fact that the spring device 11 and thus the entire switching valve 10 are constructed in a space-saving way. The switching valve in FIG. 3 is suitable for use in motor vehicles, in an injection system, an automatic transmission, or an anti-lock brake system.

If the supply of current is interrupted, the switching valve resumes the outset position shown in FIG. 3. To the extent that this applies, this process is equivalent to that in the description of FIG. 1.

The foregoing relates to the preferred exemplary embodiments of the invention, it being understood that other variants and embodiments thereof are possible within the spirit and scope of the invention, the latter being defined by the appended claims.

The invention claimed is:

1. A switching valve, comprising:
   a valve element movable in a housing;
   an actuating device urging the valve element in a first direction, the valve element having a maximum stroke in said first direction; and
   a spring device urging the valve element in a second direction, the first and second directions being opposite one another, wherein the spring device has a progressive spring characteristic, the spring device including at least two spring portions in series;

wherein the travel of at least one of the at least two spring portions is limited to a maximum travel that is less than said maximum stroke of the valve element, wherein the spring constants of each of the at least two spring portions are different from each other, and wherein said at least two spring portions are coupled via an adapter piece, and the adapter piece strikes one portion of the housing before the maximum stroke of the valve element is reached, so that the one of the at least two spring portions having the lesser spring constant is subsequently spanned across its compressed length by the adapter piece when the adapter piece strikes the portion of the housing.

2. The switching valve as defined by claim 1, wherein at said least two spring portions one spring portion is selected from the group including a helical spring, plate spring, annular washer, and a wave washer.

3. The switching valve as defined by claim 1, wherein the at least two spring portions include helical springs with different diameters, and that the adapter piece has a cup-shaped structural form, such that two spring portions each are connected functionally in series, but in spatial terms are disposed coaxially one inside another.

4. The switching valve as defined by claim 1, embodied as an electromagnetic switching valve.

5. The switching valve as defined by claim 1, disposed in an injection system, an automatic transmission, or an anti-lock brake system of a motor vehicle.

* * * * *